H. S. ROSS.
Cocks.
No. 142,122.  Fig. 1.  Patented August 26, 1873.
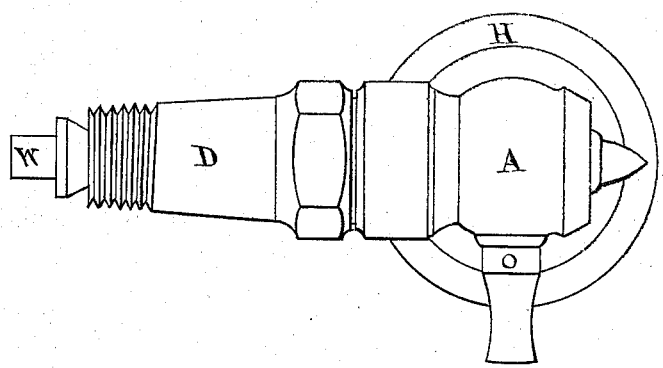
Fig. 2.
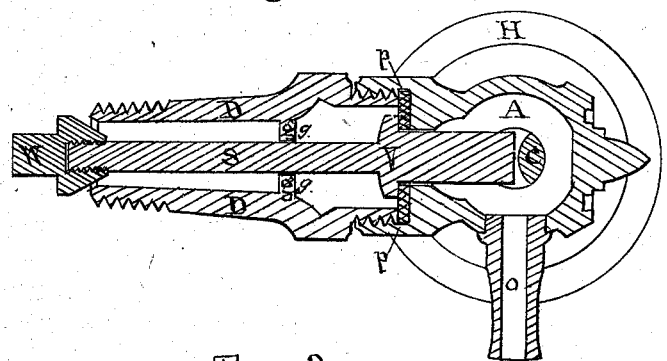
Fig. 3.
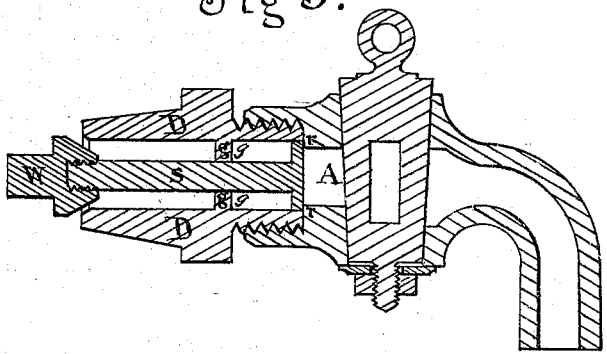
WITNESSES  INVENTOR

UNITED STATES PATENT OFFICE.

H. SCHUYLER ROSS, OF CHICAGO, ILLINOIS.

IMPROVEMENT IN COCKS.

Specification forming part of Letters Patent No. 142,122, dated August 26, 1873; application filed January 8, 1873.

*To all whom it may concern:*

Be it known that I, H. SCHUYLER ROSS, of Chicago, county of Cook and State of Illinois, have invented certain Improvements in Cocks, of which the following is a specification:

The nature of my invention consists in so constructing a cock or faucet that the outer part holding the valve or other closing device can at any time, whether under pressure or not, be removed or unscrewed without material loss of steam or fluid, for the purpose of renewing its seat or packing, or to cleanse, grind in, or clear out the same; and to such end I employ a supplementary valve with suitable seat, so placed in relation to the said outer part of cock, that when said outer part is in proper position it bears upon and holds open the said valve, allowing a free passage through the inner part of said cock for steam or fluids to the outer part and to the closing device; but upon removing or unscrewing the said outer part of cock, the said supplementary valve will be closed by the pressure of steam or fluid, and closed before the said outer part is fully removed, so that no steam or fluid can pass.

Figure 1 is a side elevation of a cock embodying my invention. Fig. 2 is a vertical longitudinal section of the same. Fig. 3 is a vertical section of a modification of my invention.

A is the crank-chamber, forming seat for valve V, and a discharge-nozzle, O, is attached; also a crank, C, and handle H. V is the principal valve or closing device, and S is the stem, in this case connecting both valves V and W, the latter being the supplementary valve, and is off its seat when the outer part A is screwed home. D is the inner part or shank, and is provided with a guide, $g\ g$.

The operation is as follows: Should it become necessary, by reason of the packing $p$ becoming destroyed or torn, or should the cock become clogged in any way, the crank-chamber A can be unscrewed from the shank D, and as the thread or screw on said shank is much longer than the distance between the valve W and its seat, the valve necessarily reaches its seat before the chamber or outer part A is fully unscrewed, preventing the passage of fluid or steam into the cock, and permitting the removal of said chamber A; and exposing all parts to be cleansed or for renewing the packing $p$.

Fig. 3 shows an adaptation of my invention to a common faucet, the stem $s$ of the valve W being on the shoulder $r$, or on other desired part of the outer part A, which on being removed allows valve to find its seat.

What I claim as my invention, and desire to secure by Letters Patent, is—

1. The stem S provided with valves V and W, in combination with the eccentric crank C, screw-shank D, and chamber A, substantially as and for the purpose set forth.

H. SCHUYLER ROSS.

Witnesses:
 JAMES S. GRINNELL,
 HARRY COLEMAN.